United States Patent [19]

Janssen et al.

[11] 4,164,768
[45] Aug. 14, 1979

[54] DUAL STAGE FLOW CONTROLLER FOR SELF-VENTILATING DISK PACK

[75] Inventors: Donovan M. Janssen, Boulder, Colo.; Anton J. Radman, Jr., Tucson, Ariz.

[73] Assignee: International Business Machines Corporation, Armonk, N.Y.

[21] Appl. No.: 939,155

[22] Filed: Sep. 1, 1978

[51] Int. Cl.² ............................................. G11B 5/016
[52] U.S. Cl. .................................................... 360/99
[58] Field of Search ................................... 360/99, 98

[56] References Cited

U.S. PATENT DOCUMENTS

| | | | |
|---|---|---|---|
| 3,936,880 | 2/1976 | McGinnis et al. | 360/99 |
| 4,051,541 | 9/1977 | McGinnis et al. | 360/99 |
| 4,143,408 | 3/1979 | McGinnis et al. | 360/99 |

*Primary Examiner*—Robert S. Tupper
*Attorney, Agent, or Firm*—Herbert F. Somermeyer

[57] ABSTRACT

A self-ventilating flexible disk pack receives operating air through a plenum chamber which communicates with the atmosphere through a flow controller. The flow controller has primary and secondary flow passages through which the flow of air is controlled by primary and secondary valves. The primary valve is used to control the creation and termination of an access opening between preselected disks. Upon closing the primary valve the flow of air into the disk pack is blocked and a high vacuum is created which allows a preselected partial split to rapidly open into a full access opening. After the primary valve is closed, a secondary valve member moves to a position in which it is responsive to the pressure within the plenum chamber for restricting and regulating the flow of air so as to maintain a bistable condition maintaining the access opening.

11 Claims, 6 Drawing Figures

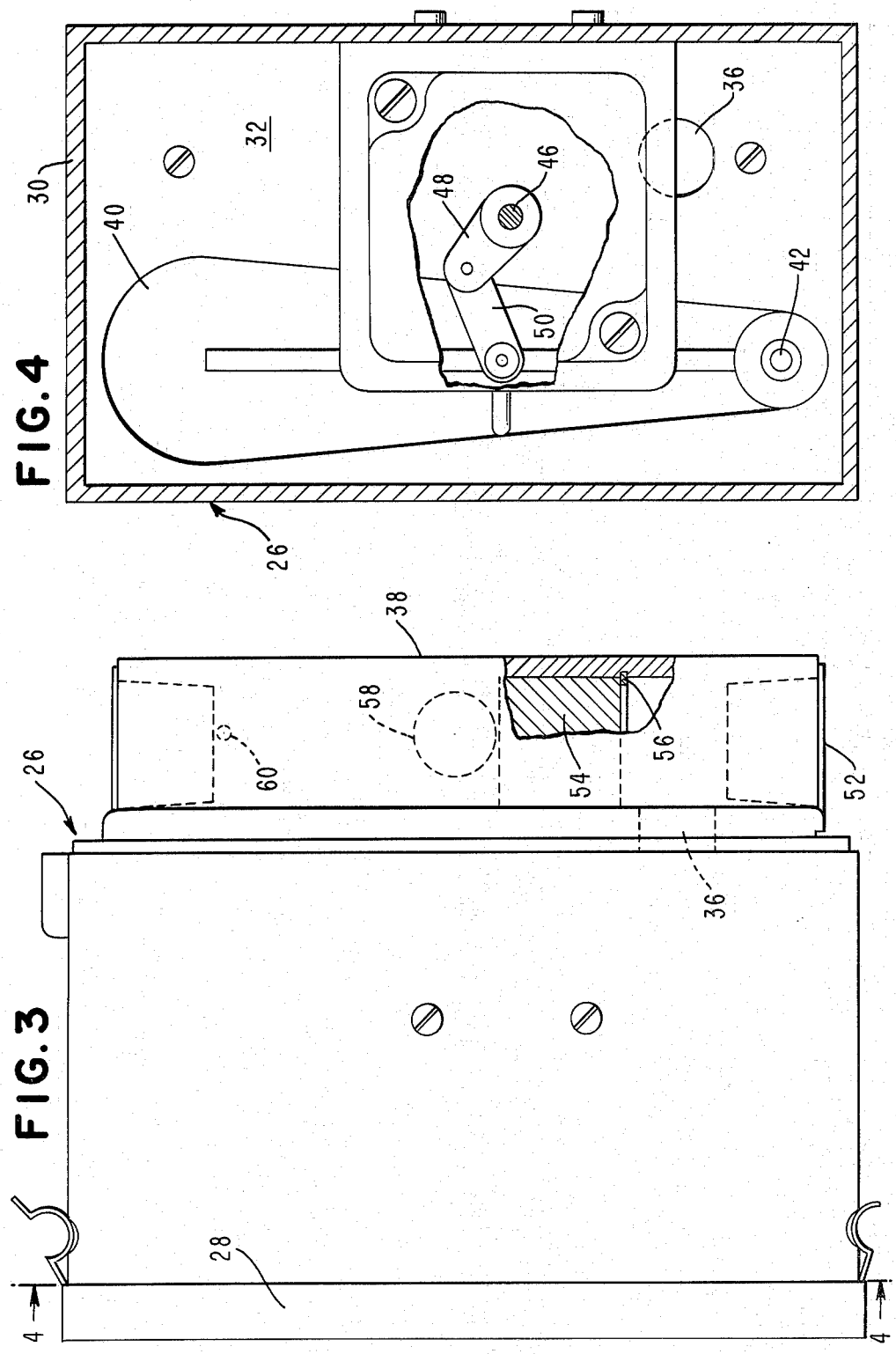

DUAL STAGE FLOW CONTROLLER FOR SELF-VENTILATING DISK PACK

DESCRIPTION

1. Technical Field

This invention relates to improvements in flexible disk pack drives and, more particularly, to a flexible disk pack drive having a novel flow controller for switching the operating conditions of the disk pack between a high-vacuum low-flow-rate, which facilitates a rapid opening of a partial split between preselected disks, and a lower-vacuum higher flow-rate within the bistable region for maintaining the access opening and a higher-pressure higher flow rate condition with the stable region of operating the disk pack.

One of the objects of the invention is to provide a novel flow controller for a self-ventilated disk pack assembly which automatically switches the operating conditions between a first relatively high vacuum condition for rapidly creating an access opening between preselected disks and a relatively lower vacuum in the the bistable region for sustaining the access opening.

Another object is to provide a flow controller in which a first valve member is operated to change the flow conditions so as to cause a rapid access opening to be created and in which a second valve member is automatically actuated after a time delay to allow a restricted flow of air under slightly higher pressure or lower vacuum conditions within the bistable region.

Still another object is to provide a dual stage flow controller for effecting a rapid access opening and thereafter regulating the pressure between the plenum chamber.

A further object of the invention is to provide a novel flow controller for operating a self-ventilated disk pack assembly so as to maintain relatively stable operating conditions regardless of the altitude at which the assembly is used.

Briefly stated, in accordance with the invention, air flows into a self-ventilated disk pack assembly through a plenum chamber that communicates with the atmosphere through a flow controller. The controller has two flow passages through which the flow of air is controlled by two valves. One valve, when opened, allows air to flow into the plenum at such a flow rate and pressure as to maintain a stable condition. Upon closing this valve member so as to block the flow of air through the passage, a high vacuum condition is created which causes a partial split between preselected disks to rapidly open into a full access opening allowing a read/write head to be inserted. The second valve member and flow passage are designed, when the second valve member is open, to allow a restricted flow of air into the plenum chamber at a flow rate and pressure within the bistable region. When the first valve member is closed, the pressure drop within the plenum chamber is used to move second valve member to an open position, the movement occuring with a time delay allowing the access opening to reach a completed condition while the full vacuum or high vacuum conditions exist. Thereafter the flow of air into the plenum chamber is increased to the bistable region and is regulated in response to the pressure within such chamber.

2. Background Art

Known in the prior art are flexible disk pack drives in which a disk pack assembly has a multiplicity of flexible disks separated by axial spacer. Off-axis longitudinal bores extend through the disk pack and allow a flow of air through the disk pack assembly. The flow rate and pressure conditions allow the pack to be operated under three general conditions, an above-bistable or stable condition, a bistable condition and an unstable or below-bistable condition. In the above-bistable or stable condition, portions of the edges of adjacent disks can be longitudinally separated to create a partial split, by means of some external force or disturbance. When the external force or disturbance is removed while in the stable region, the partial split closes. In the bistable region, an external force or disturbance is used to cause an access opening to be created between preselected disks so that a read/write head can be inserted for accessing a disk. When the external force is removed in the bistable region, the access opening is maintained or sustained until the operating conditions are changed from the bistable to the stable. The access opening can be created by initially creating a partial split while operating in the stable region and then switching the flow conditions to the bistable condition whereupon the partial split opens up into a full split or access opening. In the unstable or below bistable condition, the flow rate is greatly reduced so as to create a relatively high vacuum on the interior of the disk pack assembly. Under such conditions, multiple splits can spontaneously occur along the disk pack. U. S. Pat. No. 3,936,880, McGuiness, et al.; describes a self-ventilated flexible disk pack drive that is operable under the above-described conditions.

U. S. Pat. No. 4,051,541 discloses a self-ventilated disk pack drive assembly having an external selection and actuation apparatus in which the partial split is used in conjunction with edge coding marks and a reader to select the disk next to which an access opening is to be created. Upon reaching the desired disk, the disk pack is switched from the stable to the bistable region creating an access opening.

The prior art also recognizes the desirability of using a high vacuum condition to effect a rapid opening of the access opening and the desirability to thereafter reduce the high vacuum so as to sustain the access opening. Such phenomenon is discussed in U. S. application Ser. No. 855,539 now U.S. Pat. No. 4,143,408 filed Nov. 28, 1977 for "External Selector and Internal Controller For Flexible Disk Stack" by B. W. McGuiness, et al. and assigned to the assignee of the present application. Such application suggests the use of external vacuum sources and the use of solenoid operated valve for switching between the desired operating conditions.

BRIEF DESCRIPTION OF DRAWINGS

In the accompanying drawings forming a material part of this disclosure:

FIG. 3 is a side elevational view, of portions removed and partly in section, of the flow controller shown in FIG. 2;

FIG. 4 is a cross sectional view taken along lines 4—4 of FIG. 3, and with portions removed;

DISCLOSURE OF THE INVENTION

For further comprehension of the invention, and of the objects and advantages thereof, reference will be had to the following description and accompanying drawings, and to the appended claim in which the various novel features of the invention are more particularly set forth.

Figure 1:
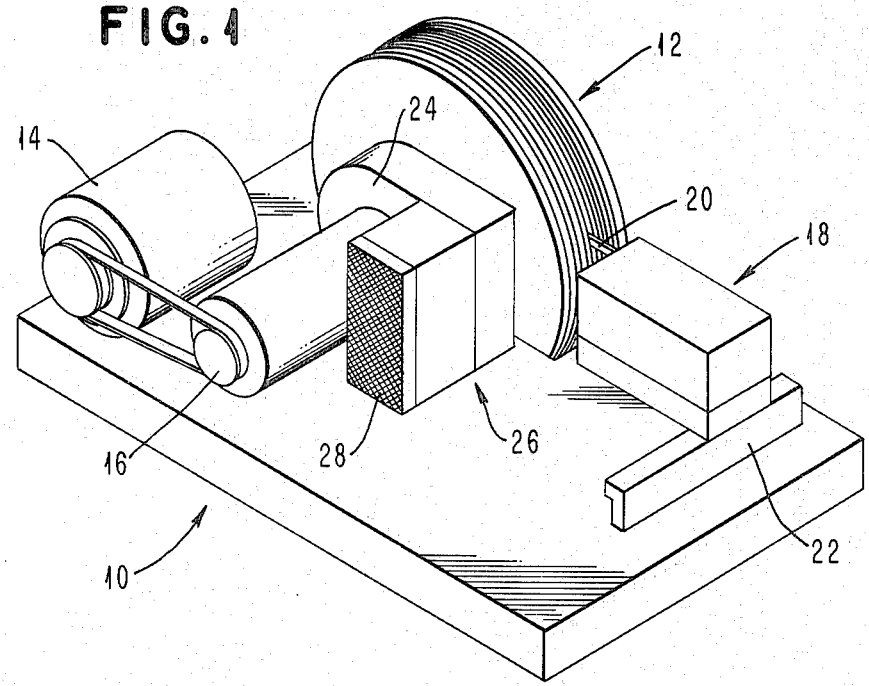
FIG. 1 is a perspective view of a self-ventilated flexible disk pack drive embodying a preferred embodiment of the invention.

Referring now to the drawings, FIG. 1 illustrates an exemplary self-ventilated flexible disk drive 10 embodying a preferred embodiment of the invention. Drive 10 includes a self-ventilated flexible disk pack assembly 12 is mounted upon a rotary spindle 16 driven by a motor 14. A disk selection and transducing mechanism 18 is shown with a transducing head extended into an access opening of disk pack assembly 12. The head can be moved radially relative to the disk pack to select a desired radial recording track. Mechanism 18 is moveable along a guide 22, when the head 20 is withdrawn to enable the assembly to move longitudinally between disks. Surrounding the central part of one end of disk pack assembly 12 is a plenum chamber 24 which through a flow controller 26 and a filter 28, communicates with the atmosphere.

Figure 2:
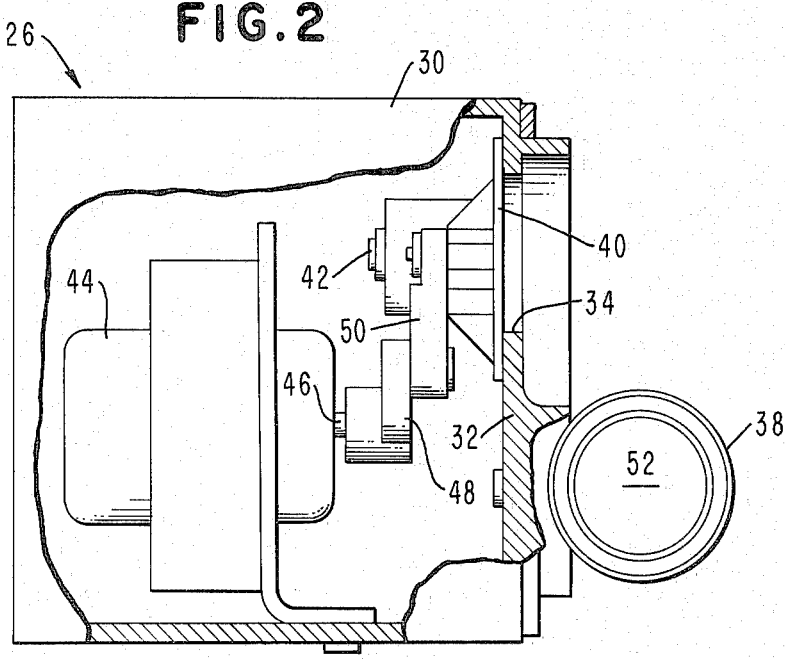
FIG. 2 is an enlarged top plan view, with portions removed and partly in section, of the flow controller shown in FIG. 1.

With reference to FIGS. 2-4, controller 26 has a box like housing 30 open at one end, the open end being covered by filter 28 (FIG. 3) to prevent or retard the flow of air born particles into the disk drive. Housing 30 includes an end wall 32 which extends across the entrance end of plenum 24. Wall 32 has a first opening 34 therein that defines a primary flow passage for air to flow through housing 30 and into plenum 24. Wall 32 also has a second opening 36 (FIG. 4) defining a secondary flow passage that leads from housing 30 into a cylinder 36 mounted on the rear wall 32. With flow controller 26 connected to the plenum, as shown in FIG. 1, cylinder 38 lies wholly within plenum chamber 24.

Figure 5:
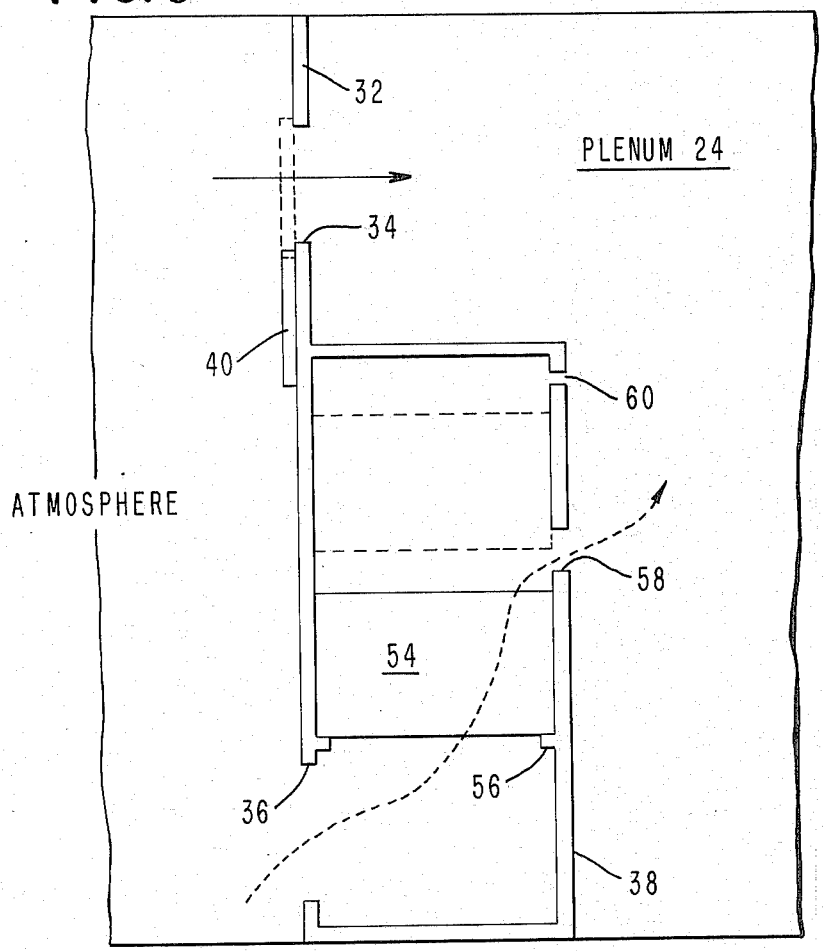
FIG. 5 is a schematic diagram useful in understanding the operation of the invention.

A valve member 40 is mounted inside of housing 30 for angular rotation about a shaft 42 between a closed position shown in FIGS. 2 and 4 and an open position shown schematically in FIG. 5 by the full line position. When valve member 40 is closed, it cooperates with wall 32 to block or prevent the flow of air through passage 34. When member 40 is in the open position, air freely flows through passage 34, the size of valve member 40 and of passage 34 being large enough to allow a high rate of flow of air through the controller, with a minimum pressure drop, so that the flow rate and pressure within the plenum are in the stable operating region wherein the pressure is at substantially atmospheric pressure. Valve member 40 is moved between positions in response to the selective energizization of a motor 44 having an output shaft 46 connected to a bell crank 48. A link 50 connects crank 48 to valve member 40. When valve member 40 is closed and motor 44 is energized, the ouput shaft 46 thereof will rotate in a clockwise direction as viewed in FIG. 4 to thereby rotate crank 48 clockwise. This motion will be transmitted to link 50 to thereby rotate valve member 40 from its closed position where it pivotally slides along wall 32 to the open position. By reversing the direction of operation of motor 44, the valve member 40 is moved from the open position to the closed position.

Cylinder 38 extends vertically and includes a tubular sidewall the ends of which are closed by caps 52. A cylindrical solid piston or valve member 54 is slidingly disposed inside cylinder 58 and, when closed, rests on a stop ring 56. Aperture 36 extends through end wall 32 and through the adjacent part of side wall of cylinder 38 to communicate with the space beneath member 54. Member 36 forms an entrance port allowing fluid to flow into the interior of cylinder 38. An exhaust port 58 is located in the middle of cylinder 38 above the closed position of member 54 and extends between the interior of cylinder 38 and plenum chamber 24. A bleed orifice 60 extends between the interior of cylinder 38 and plenum 24 near the top of the cylinder above piston 54.

Referring now to FIG. 5, during operation of the disk drive, valve 40 is moved to the open position, shown in full lines in FIG. 5, wherein the primary flow of air through passage 34 is at a flow rate and pressure to create a stable operating condition. When valve member 40 is open, mechanism 18 can be operated to move to a position adjacent a predetermined disk and create a partial split between it and an adjacent disk. When valve member 40 is moved from the open position to the closed position, shown by the dotted line, in which it cooperates with the end wall 32 to prevent the flow of air through passage 34, the centrifugal pumping action, due to rotation of the disk pack, causes the pressure in plenum 24 to drop so as to create a relatively high vacuum. As the pressure in plenum 24 drops, the pressure in cylinder 38 above piston 54 also drops, due to communication through port 58 and bleed orifice 60. Since the lower side of piston 54 is exposed to the atmostpheric pressure through passage 36, a pressure differential exists which creates a force that acts upwardly on piston 54. When the force is sufficient to overcome the weight of piston 54, piston 54 moves upwardly. When the top edge of piston 54 passes by the upper edge of port 58, air is entrapped in the space above the piston. Bleed orifice 60 allows such air to escape from the cylinder into plenum chamber 24 at a controlled rate to provide a controlled movement of piston 54 so as to give it a time delay before port 58 is uncovered during which time the high vacuum condition is maintained in plenum 24 allowing a full access opening to be created at a partial split. As piston 54 moves upwardly, eventually the lower edge thereof will start to uncover port 58 whereupon air can flow from the atmospheric side of the controller, through passage 36, through the interior of cylinder 38 and through port 58 into plenum 24. The sizes of port 58 and piston 54 are chosen to restrict the flow of air to flow rate which is in the bistable region for operation of the disk pack. Thus, once an access opening has occurred, the bistable condition which is at a higher pressure than the initial high vacuum condition in plenum 24, will sustain or maintain a stable access opening between preselected disks. Thus any subsequent closing will occur more rapidly, than if the high vacuum were to be maintained, because there is less of a vacuum that must be overcome before the closing can occur.

Figure 6:
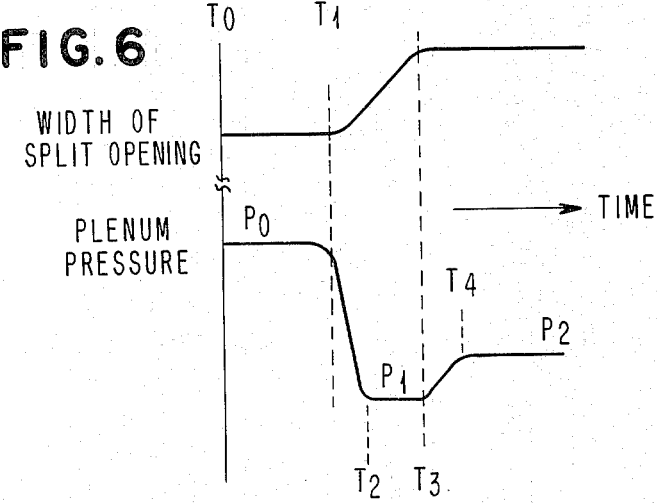
FIG. 6 are two graphs showing the relationship between the width of the disk opening and the pressure in the plenum chamber versus time, the graphs facilitating an understanding of the invention.

Referring to FIG. 6, the upper graph represents the width of a disk opening between a preselected disk and an adjacent disk at a peripheral point spaced from any partial split. At time $T_0$, the width of the opening is substantially equal to the width of the axial spacing between adjacent disks. At time $T_1$, when valve member 40 is moved from an open to a closed position, the disk opening begins to enlarge until at time $T_3$ the opening reaches the maximum width. Before time $T_1$, the pressure $P_0$ in the plenum 24 is substantially atmospheric. When valve member 40 closes at time $T_1$, the air pressure drops from $P_0$ to $P_1$ which is at a relatively high vacuum. Pressure $P_1$ is maintained for a time from $T_2$ to $T_3$ at which point the disks move to their maximum opening width. Beyond $T_3$, valve member 54 uncovers port 48 allowing the restrictive flow of air into the plenum with the result that the pressure thereupon increases from $P_1$ to $P_2$ so that at a time $T_4$, the pressure $P_2$ stablizes within the bistable region. Thereafter, when it is desired to close the access opening, valve member 40 is moved from its closed position to the open position increasing the flow rate and increasing the pressure within plenum 24 to $P_0$. The pressure increase removes the pressure differential across piston 54 which due to its own gravity bias or weight, falls downwardly until it hits stop 56.

When valve member 54 is in the dotted position shown in FIG. 5, there is a substantial pressure drop across passage 58 whereby the lower face of piston is exposed to atmospheric pressure and the upper face is exposed to the pressure within plenum 24 through bleed orifice 60. Any pressure changes within plenum 24 are thus effective to alter the position of piston 54 so as to regulate the flow of air through port 58.

It should be obvious to those skilled in the art that, instead of using a gravity biased piston 54, a spring bias piston could be substituted. Also other forms of a restrictive valve member, including diaphrams, could be used and further that some form of a motor means driven directly or indirectly by the pressure within plenum 24 could be used to physically move the valve member. A feedback control could be used to maintain a constant flow or maintain the desired set point condition.

While we have illustrated and described the preferred embodiment of our invention, it is to be understood that we do not limit ourselves to the precise constructions herein disclosed and the right is reserved to all changes and modifications coming within the scope of the invention as defined in the appended claims.

Having thus described my invention, what I claim as new, and desire to secure by Letters Patent is:

1. In a disk pack drive having a plenum chamber communicating with a rotary self-ventilated flexible disk pack to supply air from the atmosphere for operation thereof, first means defining a primary flow passage extending between the atmosphere and said plenum chamber, a first valve member disposed in said primary flow passage and being cooperable with said first means to control the flow of air through said primary flow passage, said first valve member being selectively movable between open and closed positions, said first means and said first valve member being operative when said first valve member is in an open position to allow air to flow through said primary flow passage at a flow rate and pressure to maintain said disk pack in an above-bistable operating condition characterized by:

said first means and said first valve member being operative upon movement of said first valve member into said closed position to shut off the flow of air through said primary passage allowing said rotary disk pack to pump air from said plenum chamber and create a relatively high vacuum to cause an access opening to rapidly form between preselected disks;

second means defining a secondary flow passage parallel to said primary flow passage and communicating between said plenum chamber and the atmosphere, a second valve member disposed in said secondary flow passage and co-operable with said second means to control the flow of air through said secondary flow passage into said plenum chamber, said second valve member being movable between closed and open positions; said second valve member and said second means preventing the flow of air through said secondary flow passage when said second member is in said closed position, said second valve member and said second means restricting the flow of air through said secondary flow passage when said second valve member is in said open position so as to create in said plenum chamber a partial vacuum lower than said relatively high vacuum and within a range creating a bistable condition so as to maintain said access opening;

and third means responsive to the pressure within said plenum chamber for controlling movement of said second valve member, said third means being operative in response to closing of said first valve member to move said second valve member from said closed position to said open position in such a manner as to cause a time delay allowing said preselected disks to move to a fully open access opening while said relatively high vacuum is in said plenum chamber.

2. The combination of claim 1 wherein said second valve member is movable to a plurality of open positions restricting the flow of air to different rates, and said third means is further operative to move said second valve member between said open positions in response to pressure changes in said plenum chamber so as to regulate such flow of air.

3. The combination of claim 1 wherein second valve member has a first surface exposed to the pressure within said plenum chamber and a second surface exposed to substantially atmospheric pressure so as to create a force, when a pressure differential exists between the pressure in said plenum chamber and the atmosphere, which force acts on said second valve member so as to move it between positions.

4. The combination of claim 3 wherein said first and second means comprises a housing having said first and second flow passages therein, and a cylinder attached to said housing with said second flow passage extending there through; and said second valve member comprising a piston slidingly mounted in said cylinder, said first and second surfaces being on said piston.

5. The combination of claim 4 wherein said third means comprises chamber in said cylinder to one side of said second valve member and said second flow passage for entrapping a quantity of air upon movement of said piston from said closed position, said cylinder having a bleed orifice extending between said chamber and said cylinder for controlling the rate at which air escapes from said chamber so as to control the length of time it takes for said piston to move into an open position.

6. The combination of claim 3 wherein said second valve member is biased towards said closed position with a predetermined force.

7. The combination of claim 6 wherein said second means comprises a vertical cylinder, and said second valve member is mounted in said cylinder and is biased by gravity towards said closed position.

8. In a disk drive having a plenum chamber communicating with a rotary self-ventilating flexible disk pack to supply operating air thereto, and disk accessing means for locating a preselected disk and applying an actuating force thereto to create a partial split between such disk and an adjacent disk, a flow controller connected to said plenum chamber to control the flow of air from the atmosphere into said plenum and disk pack, characterized by:

a housing having a primary and second flow passages therethrough; primary and secondary valve members cooperable with said housing to control the flow of air through said primary and secondary passages; selectively operable first actuating means for moving said primary valve member between an open position wherein air flows through said primary passage at a rate and pressure to create a stable condition within said disk pack and a closed position wherein air is blocked from flowing through said primary passage; second actuating means responsive to the pressure within said plenum chamber for moving said second valve member between closed and open positions and including means for delaying the opening of said second valve member; said first actuating means being adapted to be operated when said partial split has been created to close said first valve member to create a high vacuum condition in said plenum whereby said partial split opens into a full stable split, the resultant change in pressure in said plenum causing said second actuating means to move said second valve member, when said full stable split has been created, to an open position wherein air flows through said second passage at a rate and pressure to create a bistable condition in said pack to maintain said full stable split thus permitting accessing said predetermined disk.

9. The combination of claim 8 comprising:
said housing having port means in said secondary passage opening into said plenum chamber and cooperable with said second valve member for controllably restricting the flow of air through said secondary passage.

10. The combination of claim 9 wherein said second actuating means comprises first and second surfaces exposed to atmospheric pressure to the pressure in said plenum chamber whereby a pressure differential between such pressures is effective to move said second valve member.

11. The combination of claim 10 wherein the flow of air through said second passage is restricted so as to create a pressure drop through said port, said first and second surfaces being exposed to pressures upstream and downstream of said port.

* * * * *